Jan. 6, 1970 W. N. SEXTON 3,487,577
INSECT EXTERMINATING METHOD
Filed Dec. 29, 1967
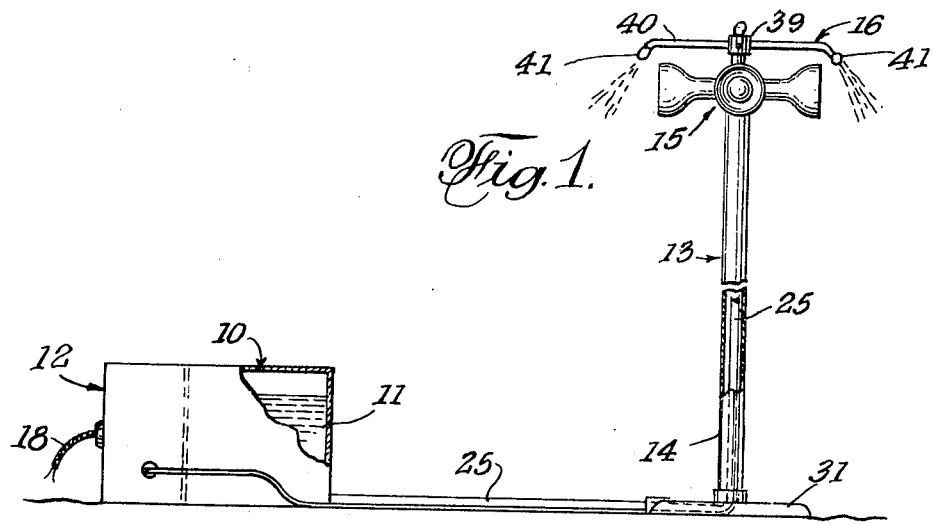
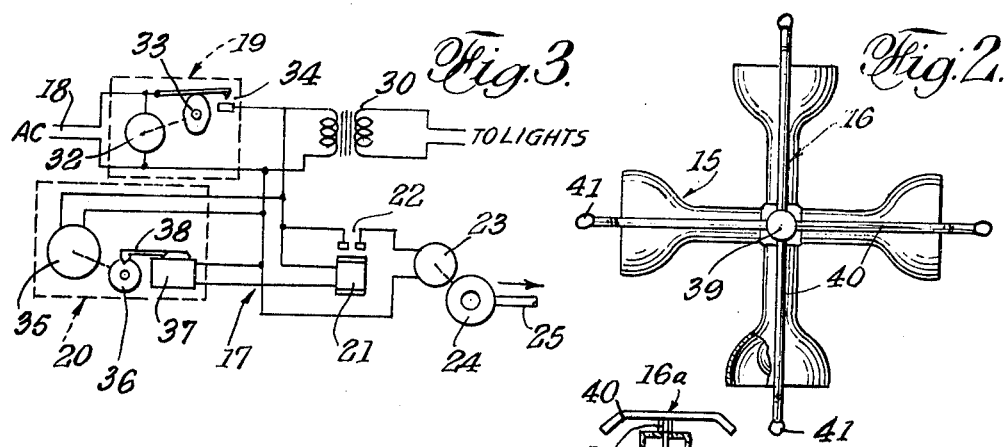
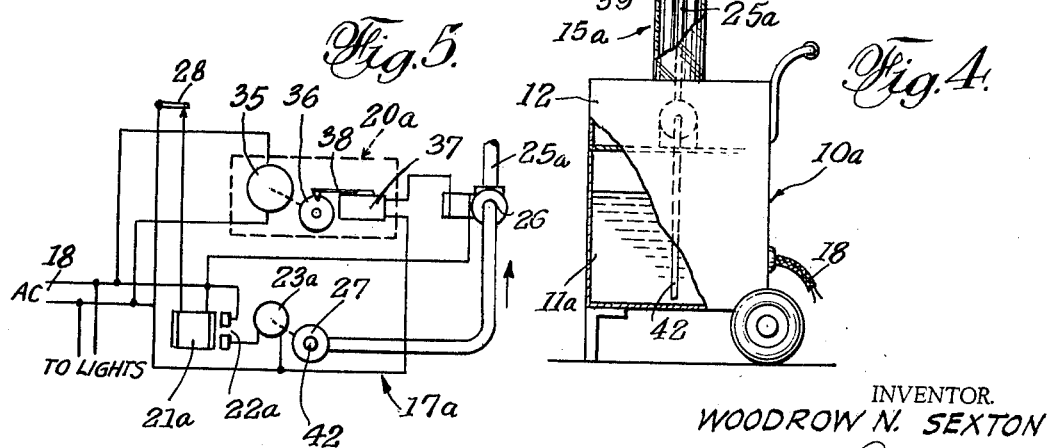
INVENTOR.
WOODROW N. SEXTON
BY
Lipman Jackman
ATTORNEY United States Patent Office 3,487,577
Patented Jan. 6, 1970

3,487,577
INSECT EXTERMINATING METHOD
Woodrow N. Sexton, Brawley, Calif., assignor of one-third to W. B. Poindexter, El Centro, Calif., and one-third to L. M. Le Master, Brawley, Calif.
Filed Dec. 29, 1967, Ser. No. 694,720
Int. Cl. A01m 1/04
U.S. Cl. 43—113
2 Claims

ABSTRACT OF THE DISCLOSURE

An automatic insect exterminator for attacking flying insects rather than their larvae and comprising insect-luring lights adapted to be located in areas adjacent to the plants or crops to be protected, but not in contact therewith, to attract such insects, means to time the operation of the lights, means to generate and conduct sprays of insecticide and to discharge the same into the area illumined by the lights to exterminate insects attracted by said lights, and means controlled by the light-timing means to intermittently operate the latter means.

BACKGROUND OF THE INVENTION

Eradicating insects, harmful to and destructive of crops, by means of insecticides, has produced results that are undesirable, particularly if there is danger to humans. Applying insecticides to the crops by dusting, spraying, or other contact methods, are common ways giving such undesirable results.

The present invention seeks to obviate the above faults in insect-eradicating methods by luring the insects to areas above and away from the plants or the crop to be protected, by means of lighting to which the insects are attracted, and while so enticed away from the plants, subjecting them to an exterminating insecticide spray. It is an object of the invention to provide both a method and apparatus effective to produce the above desirable results.

This invention also has for its objects to provide a novel, economical and convenient method of process of superior utility, and to provide apparatus that is positive in operation, convenient in use, easily installed in working position and easily disconnected therefrom, economical of manufacture, relatively simple, and of general superiority and serviceability.

The invention also contemplates novel combinations of method steps as well as novel details of construction and novel combinations and arrangements of parts, which will appear more fully in the course of the following description, which is based on the accompanying drawing. However, said drawing merely shows, and the following description merely describes the invention with respect to, preferred methods and apparatus, the same, nevertheless, being given by way of illustration or example only.

SUMMARY OF THE INVENTION

The apparatus according to the present invention comprises, generally, and in one preferred form thereof, a unit 10 comprising a tank 11 for liquid insecticide, and a compartment 12 for housing operating equipment to be described hereinafter, a second unit 13 comprising a stand or tower 14, a light assembly 15 at the upper end of said tower, and an insecticide spray assembly 16 adjacent to and preferably above the light assembly, an electric circuit 17 having an AC power source disposed in the compartment 12, a clock timer 19 connected to said power source to operate the light means 15 at timed intervals, a switch unit 20 also timed by the clock timer 19 to energize a control relay 21 and the normally open switch 22, a motor 23 operative upon closing of the switch 22 to drive a pump 24 for supplying insecticide from the tank 11, through a hose 25, to the spray assembly 16.

The apparatus according to a second form thereof, is in the form of a portable, self-contained unit requiring only an AC power source 18 for operation thereof as located in the area to be treated for extermination of flying insects. This form of the invention comprises, generally, a wheel-mounted housing 10a which may be compartmented into a tank 11a and a compartment 12a, as before; but in this instance, the housing mounts the light unit 15a and the spray assembly 16a, the tower 14 of the earlier embodiment being omitted, an electric circuit 17a receiving electric power from said power source 18 housed in the compartment 12a, a timed switch unit 20a embodied in said circuit, a solenoid valve 26 in said compressed air line 25a controlled by said unit 20a, a relay 21a which, when energized, closes a normally open switch 22a, a motor 23a operative upon closing of the switch 22a to drive a compressor 27 to supply the line 11a with insecticide for ultimate discharge from the spray assembly 16a, and a pressure control switch 28 in circuit with the compressor motor 23a to regulate the operation of the compressor 27.

BRIEF DESCRIPTION OF THE DRAWING

In the drawing, like reference characters designate similar parts in the several views.

FIG. 1 is a semi-schematic view of one form of an automatic insect exterminator according to the present invention.

FIG. 2 is an enlarged plan view of the illuminating and spraying portions of the exterminator.

FIG. 3 is an electric wiring diagram showing the components of the invention and the interconnecting circuitry.

FIG. 4 is a side elevational view of another and more compact and portable form of an exterminator according to the present invention.

FIG. 5 is an electric wiring diagram showing the components as in the form of FIG. 4 and the interconnecting circuitry.

DESCRIPTION OF THE PREFERRED EMBODIMENTS

The tank 11, for the purposes of this invention, stores an insecticide chemical solution that, in practice, may have a ten cubic foot capacity. While shown as part of the unit 10, it may be separated therefrom. The compartment 12 or other enclosure houses the timing mechanisms 19 and 20, a transformer or ballast 30 for producing ultra-violet light or black light (ultra-violet or infra-red), and may house or mount the control relay 21. The motor 23 and the pump 24 driven thereby may be mounted, as desired, on the unit 10.

The tower 14 of the unit 13 may be mounted on a pedestal 31 or have any suitable base or support to elevate the light assembly 15 and the spray assembly 16 at a sufficient height above the plants or crops in the vicinity of which the extermination of insects is to be effected.

The clock timer 19 is embodied in the circuit 17 and is shown as conventionally comprising a synchronous motor 32 across the line 18 and which rotates a twenty-four hour cam 33 that controls a switch 34 to close at a predetermined time and, thereby, energize the transformer or ballast 30, thereby connecting the lights 15 in electric circuit with the current source 18. Instead of the lights 15 being of the character above mentioned, the same may comprise incandescent lights, in which case the component 30 would be omitted. The lights will be lit during any period that the switch 31 is closed.

The switch unit 20 comprises an electric motor 35 which drives a cam 36 that normally holds a microswitch 37 open, the latter closing only when a notch in cam 37 releases the switch actuator 38 and allows it to move to switch-closing position. In practice, the motor 35 is geared to cause the cam to make one revolution each twelve minutes or so, thus closing the circuit from the current source 18 through the control relay 21 each twelve minutes during the time the switch 34 of the timer 19 is closed and for a period during which the actuator 38 is moving into and out of the notch in cam 36. This period may be arranged to ten to twelve seconds.

Energization of the coil 21 causes the same to close the switch 22, thereby operating the motor 23 through that portion of the circuit 17 to the source 18 in which the switches 34 and 22 are located. Therefore, the pump 24 will draw chemical insecticide from the tank 11, through the hose 25, and through the latter to the spray assembly 16.

The spray assembly 16 is mounted above the light assembly on a swivel 39 from which radially extend tubular arms 40 having bent nozzle ends 41 which induce rotation of the assembly under exiting forces generated by the insecticide as the same, in spray form, is propelled under the pressure of the pump. In practice, the assembly is designed, according to the shape and direction of the nozzle ends 41, to cover a desired area. A circle of about thirty-five feet in diameter will circumscribe an area that has proven to be effective for exterminating flying insects. It will be understood that the size of the area covered will vary according to the power and capacity of the pump 24. Also, more than one tower 14 may be provided, suitably spaced for most ideal coverage.

In the form of the invention shown in FIGS. 4 and 5, the lighting means 15a is shown as of the fluorescent type; the pumping of the insecticide is effected by a compressor 27 under operative control of a pressure switch 28 subject to the pressure through a line 42 from the tank 11a. The switch unit 20a is timing-cam-controlled, as before, the switch 37 thereof, when closed, closing the circuit to the pressure switch through the relay coil 21a and the solenoid of the valve 26.

It will be clear from the foregoing that the insecticide is directed as a spray to an area above the plants to be protected from damaging flying insects, and that the insects are drawn to said area so they may be subjected to the insecticide spray.

While the foregoing illustrates and describes what is now contemplated to be the best mode of carrying out the invention with respect to both the method and apparatus, the same is, of course, subject to modification without departing from the spirit and scope of the invention. Therefore, it is not desired to restrict the invention to the particular method steps or combination or sequence of steps described, nor to the particular forms of construction illustrated and described, but to cover all equivalents or modifications of method and apparatus that may fall within the scope of the appended claims.

Having thus described the invention, what is claimed and desired to be secured by Letters Patent is:

1. The method of exterminating flying agricultural insects that consists in attracting the insects by means of lights disposed above and in spaced relation to growing plants and intermittently spraying the area in the vicinity of the lights with insecticides to exterminate the insects present in said area.

2. The method according to claim 1 wherein the spray is moved in a circular path at the center of which the lights are disposed.

References Cited

UNITED STATES PATENTS

| | | | |
|---|---|---|---|
| 1,819,551 | 8/1931 | Gourdon | 43—113 |
| 1,982,315 | 11/1934 | Lundberg | 239—19 |
| 2,578,863 | 12/1951 | Trelease | 119—51 |
| 2,883,114 | 4/1959 | Horvath | 239—19 |
| 3,239,960 | 3/1966 | Stevens | 43—129 |
| 3,319,374 | 5/1967 | Gawne | 43—113 X |

ALDRICH F. MEDBERY, Primary Examiner

U.S. Cl. X.R.

43—132; 239—19